(12) United States Patent
Augustin et al.

(10) Patent No.: US 8,918,760 B2
(45) Date of Patent: Dec. 23, 2014

(54) TEST SCRIPT GENERATION FOR APPLICATION IMAGE VALIDATION

(71) Applicant: SugarCRM Inc., Cupertino, CA (US)

(72) Inventors: Larry Augustin, Los Altos, CA (US); Lila Tretikov, Los Gatos, CA (US); Ran Zhou, Campbell, CA (US); David Safar, Sunnyvale, CA (US)

(73) Assignee: SugarCRM Inc., Cupertino, CA (US)

( * ) Notice: Subject to any disclaimer, the term of this patent is extended or adjusted under 35 U.S.C. 154(b) by 6 days.

(21) Appl. No.: 13/708,845

(22) Filed: Dec. 7, 2012

(65) Prior Publication Data

US 2014/0165040 A1    Jun. 12, 2014

(51) Int. Cl.
*G06F 9/44*          (2006.01)

(52) U.S. Cl.
USPC ............................................. 717/115

(58) Field of Classification Search
USPC ............... 717/125, 115; 715/255; 704/276; 386/95, 245; 707/999.103, 756
See application file for complete search history.

(56) References Cited

U.S. PATENT DOCUMENTS

| | | | | |
|---|---|---|---|---|
| 2003/0084429 | A1* | 5/2003 | Schaefer | 717/125 |
| 2008/0107397 | A1* | 5/2008 | Kang et al. | 386/95 |
| 2008/0256126 | A1* | 10/2008 | Nelin et al. | 707/103 Y |
| 2010/0131520 | A1* | 5/2010 | Weinberg et al. | 707/756 |
| 2011/0214107 | A1* | 9/2011 | Barmeir et al. | 717/125 |

\* cited by examiner

*Primary Examiner* — Tuan A Vu

(74) *Attorney, Agent, or Firm* — Steven M. Greenberg, Esq.; CRGO Law

(57) ABSTRACT

Embodiments of the present invention provide a method, system and computer program product for automated test script generation for application image validation. In an embodiment of the invention, a method of automated test script generation for application image validation is provided. The method can include parsing different modules of an existing image of a customized form of a base application to identify graphical user interface (GUI) elements in different screens of each of the different modules and cataloguing in a GUI element catalog, different GUI elements identified during parsing. The method also can include generating test scripts from the GUI element catalog. Finally, the method can include applying the generated test scripts to a new image of the customized form of the base application.

18 Claims, 1 Drawing Sheet

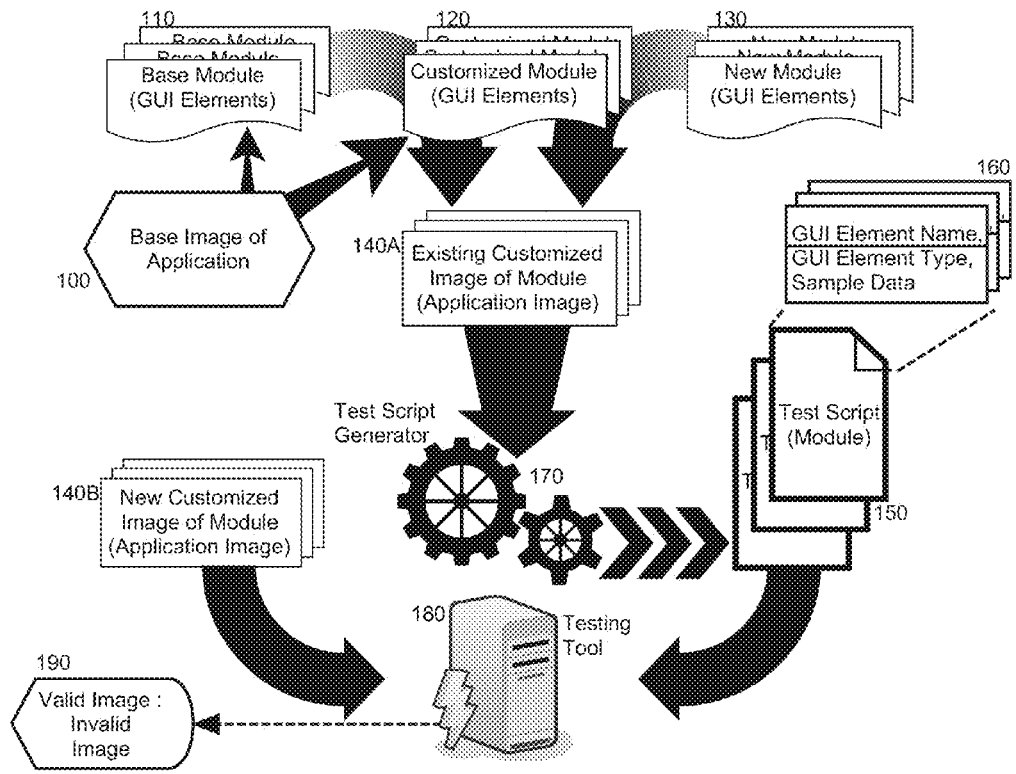
FIG. 1
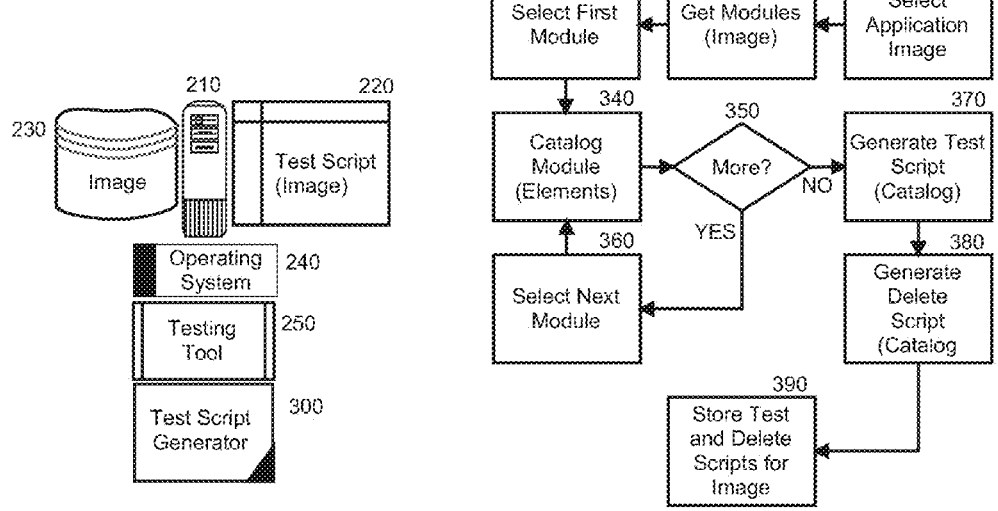
FIG. 2
FIG. 3

TEST SCRIPT GENERATION FOR APPLICATION IMAGE VALIDATION

BACKGROUND OF THE INVENTION

1. Field of the Invention

The present invention relates to the field of functional and operational testing of a computer program and more particularly to test script generation for functional and operational testing of a computer program.

2. Description of the Related Art

Software functional testing relates to the functional testing of a graphical user interface (GUI) coupled to an underlying software application. Conventional functional testing tools allow the end user to create, modify and run functional, distributed functional, regression and smoke tests for applications built using any of a wide variety of integrated development environments. In this regard, the conventional functional testing tool can generate a test script for a GUI in which elements of the GUI can be exercised both sequentially and conditionally. Through a thorough testing of the GUI of an application, the functional testing tool can automatically identify defects early, often and repeatably.

Operational testing, in comparison to functional testing, refers to the exercise of the logical performance of an application under test. In operational testing, the invocation of an object can be used to compare an expected outcome with an actual outcome from the invocation. Both operational and functional testing can be automated through the use of testing scripts. Testing scripts can be produced manually and provided as input to a testing engine, or the testing scripts can be generated in an automated fashion. In the latter instance, a conventional testing tool can monitor and record the interaction between end user and GUI during a recording phase of testing. During the recording phase, a testing script can be produced based upon the identity of GUI elements addressed by the end user, the corresponding logical operations invoked by the addressing of the GUI elements, the results of the invocation, and the sequence in which the GUI elements are addressed.

Monitoring the interaction between an end user and GUI elements of a GUI in order to automate the generation of a testing script requires that the GUI elements within the GUI remain statically present within the GUI. To the extent the GUI changes, so too must the generated script. Yet, in an era of highly customizable GUIs permitted to be customized by the end user, static GUIs are not to be counted upon and therefore, the automated generation of a testing script can be complicated.

Further, in the context of testing a complex application with extensive customization options, manually crafting automated testing scripts capable of adequately exercising the customized areas of the Web application can be complicated, resource-intensive, and prone to human error. Additionally, testing scripts created manually are inflexible, useful only for testing specific customizations which must be planned in advance. Such scripts will fail if run against an instance of the application which has not had the anticipated customizations applied, and those manually created scripts overlook any new customizations which have been introduced.

In this way, the creation and use of manual testing scripts result in an excessive maintenance burden for the testing automation staff. Consequently, a more flexible, thorough, and automatic solution for creating testing scripts which require less maintenance overhead would be desirable in order to efficiently and effectively produce automated testing scripts for such an application.

BRIEF SUMMARY OF THE INVENTION

Embodiments of the present invention address deficiencies of the art in respect to automated test script generation and provide a novel and non-obvious method, system and computer program product for automated test script generation for application image validation. In an embodiment of the invention, a method of automated test script generation for application image validation is provided. The method can include parsing different objects of an existing image of a customized form of a base application to identify GUI elements in different screens of each of the different modules and cataloguing in a GUI element catalog, different GUI elements identified during parsing along with their relative placement and interaction. The method also includes generating test scripts from the GUI element catalog. Finally, the method includes applying the generated test scripts to a new image of the customized form of the base application.

In another embodiment of the invention, a testing tool data processing system is provided. The system includes a host computing system and a testing tool executing in memory of the host computing system. The testing tool in turn is configured to apply generated test scripts to a new image of a customized form of a base application. Finally, the system includes a test script generator module coupled to the testing tool. The module includes program code enabled upon execution in the memory of the host computing system to parse different modules of an existing image of a customized form of a base application to identify GUI elements in different screens of each of the different modules, to catalog in a GUI element catalog, different GUI elements identified during parsing, and to generate a plurality of test scripts from the GUI element catalog.

In one aspect of the embodiment, the GUI element catalog includes a list of GUI elements in each module, names for the GUI elements, types for the GUI elements and sample data. In another aspect of the embodiment, the list of GUI elements also indicates an arrangement of the GUI elements with respect to one another in different screens of the modules. In yet another aspect of the embodiment, the list of GUI elements also indicates interrelationships between the different modules. Optionally, a test script can be generated for each of the modules and a corresponding delete script can be generated for each test script. As such, each delete script can provide directives to undo data manipulations in the new image resulting from the application of a corresponding test script. Finally, in even yet another aspect of the embodiment, the GUI element catalog can include a line of comma separated values for each GUI element in each module, each comma separated value of a line corresponding respectively to a name, type and sample data for a corresponding GUI element.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for automated test script generation for application image validation;

FIG. 2 is a schematic illustration of testing tool data processing system configured for automated test script generation for application image validation; and, FIG. 3 is a flow chart illustrating a process for automated test script generation for application image validation.

DETAILED DESCRIPTION OF THE INVENTION

Embodiments of the invention provide for automated test script generation for application image validation. In accordance with an embodiment of the invention, a deployed image of a customizable form of an application that includes multiple different modules, each with one or more screens of one or more different GUI elements can be selected for automated test script generation. The GUI elements of at least one screen of each module can be cataloged to specify at least an identification of each GUI element and a corresponding module, a type for the GUI element, and sample data for use with the GUI element. Thereafter, a test script can be generated from the catalog for each module to apply the sample data as input to each GUI element for a corresponding one of the modules. Additionally, a delete script can be generated with entries configured to reverse the application of the sample data. Consequently, when deploying a different instance of the same image of the customizable form of the application, the generated test scripts and delete scripts can be executed against the different instance of the same image of the customizable application to validate the different instance without requiring the tedious maintenance of manual test scripts produced for the deployed image.

In further illustration, FIG. 1 is a pictorial illustration of a process for automated test script generation for application image validation. As shown in FIG. 1, a base image 100 of an application such as a customer relationship management (CRM) application can be customized into a different customized image 140A of the base image 100 of the application that includes both unmodified individual modules 110 of the base image 100, modified modules 120 of the base image 100 and optionally, new modules 130 of the base image 100. Each of the modules 110, 120, 130 can include one or more GUI elements disposed within forms or screens presented by the modules 110, 120, 130 for example text input fields, selection boxes, radio button controls, checkbox controls and the like. Further, each of the GUI elements can be referenced in the modules 110, 120, 130 according to programmatic code directives such as those present in markup for example, markup specified according to the extensible markup language (XML).

A test script generator 170 can parse the programmatic code directives of each of the modules 110, 120, 130 of the different image 140 of the base image 100 and can catalog the referenced GUI elements in a catalog of GUI elements by name, type and sample data provided therethrough. The test script generator 170 further can identify and catalog for each of the modules 110, 120, 130 an arrangement of the GUI elements which can be expressed by an ordering of the GUI elements in the catalog of GUI elements. The test script generator 170 even further can identify the interrelationship between the different modules 110, 120, 130 as evident from references to different modules in the GUI elements.

Thereafter, the catalog of GUI elements can be transposed into different test scripts 150 according to the catalog entries 160 produced during cataloging of the GUI elements by the test script generator 170. As such, the collection of the test scripts 150 can reflect a customized set of test scripts for the different image 140A of the base image 100. Consequently, a testing tool 180 can apply the test scripts 150 against a newly deployed image 140B of the existing customized image 140A to produce a determination 190 of whether the newly deployed image 140B is a valid form of the customized image 140A.

The process described in connection with FIG. 1 can be deployed within a testing tool data processing system. In yet further illustration, FIG. 2 schematically shows a testing tool data processing system configured for automated test script generation for application image validation. The system can include a host computing system 210 that can include one or more different computers each with its own memory and at least one processor. The host computing system 210 can support the execution of an operating system 240 in which a testing tool 250 can operate.

The testing tool 250 can be configured to apply one or more test scripts 220 against an image 230 of an application to determine through either or both functional and operational testing whether or not the image 230 of the application is valid based upon the presence or absence of expected GUI elements in the image 230, the positional arrangement of the expected GUI elements as compared to an expected arrangement set forth in the test script 220, the functional dependencies between different modules of the image 230 as evident from inter-module references of the GUI elements specified in the test script 220 and the ability of the GUI elements to process sample data of a particular data type as provided by the test script 220.

Of note, a test script generator module 300 can be coupled to the testing tool 250. The module 300 can include program code that when executed in the memory of the host computing system 210 can be enabled to generate the test script 220 for the image 230 by parsing each module of the image 230 to identify different GUI elements, to catalog those GUI elements according to name, type and sample data, as well as arrangement in corresponding screens of the modules, and also to catalog any interrelationship between the different modules of the image 230, and to transpose the catalog into the test script 220 along with counter-directives to reverse any data modifications, additions or deletions to the image that prospectively would be caused by an application of the test script 220 to the image 230.

In even yet further illustration of the operation of the test script generator module 300, FIG. 3 is a flow chart illustrating a process for automated test script generation for application image validation. The process can begin in block 310 with the selection of an application image, such as an image of a CRM application that includes multiple different Web application modules defined according to markup. In block 320, the modules of the image can be retrieved and in block 330, first one of the modules can be selected for processing.

In block 340, the GUI elements of the selected module can be cataloged in a GUI element catalog such as a flat file containing comma separated values for each field and a line for each catalogued GUI element, to include in different fields not only a name, acceptable data type to be received and sample data for each GUI elements, but also an arrangement of the GUI elements relative to one another in a corresponding screen of the selected module and any positional and/or functional interrelationships or dependencies evident from the GUI elements. In decision block 350, if additional modules remain to be processed for the application image, in block 360 a next module in the application image can be selected for processing. Otherwise, when no further modules of the application image remain to be processed, the test script generation process can continue through block 370.

In block 370, a test script can be generated from the catalog of GUI elements. In this regard, the test script can include one or more XML files each corresponding to a different one of the modules of the application image. Each test script can include the data from the catalog for a corresponding GUI element so that when a testing tool processes the test script, the testing tool can attempt to locate each referenced GUI elements, provide sample input to the located GUI element and also to confirm the proper arrangement of the GUI elements relative to one another and also the presence of any interrelationships between modules indicated by the GUI elements specified in the test script. Likewise, in block 380, corresponding delete scripts can be generated for each test script. Each delete script can include directives to undo any data operations performed by the corresponding test script during the application of the test script to an associated module of an image of an application under test. Finally, in block 390 the test scripts and delete scripts can be stored for subsequent use by a testing tool for the application image.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method of automated test script generation for application image validation, the method comprising:
    parsing source code of different modules of an existing image of a customized form of a base application to identify in the source code graphical user interface (GUI) elements in different screens of each of the different modules;
    cataloguing in a GUI element catalog, different GUI elements identified during parsing;
    generating a plurality of test scripts from the GUI element catalog; and,
    applying the generated test scripts to a new image of the customized form of the base application.

2. The method of claim 1, wherein the GUI element catalog comprises a list of GUI elements in each module, names for the GUI elements, types for the GUI elements and sample data.

3. The method of claim 2, wherein the list of GUI elements also indicates an arrangement of the GUI elements with respect to one another in different screens of the modules.

4. The method of claim 2, wherein the list of GUI elements also indicates positional and functional interrelationships between the different modules.

5. The method of claim 1, wherein a test script is generated for each of the modules and a corresponding delete script is generated for each test script, each delete script providing directives to undo data manipulations in the new image resulting from the application of a corresponding test script.

6. The method of claim 1, wherein the GUI element catalog comprises a line of comma separated values for each GUI element in each module, each comma separated value of a line corresponding respectively to a name, type, location, relationship, and sample data for a corresponding GUI element.

7. A testing tool data processing system comprising:
    a host computing system;
    a testing tool executing in memory of the host computing system and configured to apply generated test scripts to a new image of a customized form of a base application; and,
    a test script generator module coupled to the testing tool, the module comprising program code enabled upon execution in the memory of the host computing system to parse source code of different modules of an existing image of a customized form of a base application to identify in the source code graphical user interface (GUI) elements in different screens of each of the different modules, to catalog in a GUI element catalog, different GUI elements identified during parsing and to generate a plurality of test scripts from the GUI element catalog.

8. The system of claim 7, wherein the GUI element catalog comprises a list of GUI elements in each module, names for the GUI elements, types for the GUI elements and sample data.

9. The system of claim 8, wherein the list of GUI elements also indicates an arrangement of the GUI elements with respect to one another in different screens of the modules.

10. The system of claim 8, wherein the list of GUI elements also indicates positional and functional interrelationships between the different modules.

11. The system of claim 7, wherein a test script is generated for each of the modules and a corresponding delete script is generated for each test script, each delete script providing directives to undo data manipulations in the new image resulting from the application of a corresponding test script.

12. The system of claim 7, wherein the GUI element catalog comprises a line of comma separated values for each GUI element in each module, each comma separated value of a line corresponding respectively to a name, type, location, interrelationship and sample data for a corresponding GUI element.

13. A computer program product for automated test script generation for application image validation, the computer program product comprising:
    a computer readable storage medium comprising a memory device having computer readable program code embodied therewith, the computer readable program code comprising:
    computer readable program code for parsing source code of different modules of an existing image of a customized form of a base application to identify in the source code graphical user interface (GUI) elements in different screens of each of the different modules;
    computer readable program code for cataloguing in a GUI element catalog, different GUI elements identified during parsing;
    computer readable program code for generating a plurality of test scripts from the GUI element catalog; and,
    computer readable program code for applying the generated test scripts to a new image of the customized form of the base application.

14. The computer program product of claim 13, wherein the GUI element catalog comprises a list of GUI elements in each module, names for the GUI elements, types for the GUI elements and sample data.

15. The computer program product of claim 14, wherein the list of GUI elements also indicates an arrangement of the GUI elements with respect to one another in different screens of the modules.

16. The computer program product of claim 14, wherein the list of GUI elements also indicates positional and functional interrelationships between the different modules.

17. The computer program product of claim 13, wherein a test script is generated for each of the modules and a corresponding delete script is generated for each test script, each delete script providing directives to undo data manipulations in the new image resulting from the application of a corresponding test script.

18. The computer program product of claim 13, wherein the GUI element catalog comprises a line of comma separated values for each GUI element in each module, each comma separated value of a line corresponding respectively to a name, type, location, interrelationship and sample data for a corresponding GUI element.

\* \* \* \* \*